(12) United States Patent  (10) Patent No.: US 11,844,296 B2
Landis  (45) Date of Patent: Dec. 19, 2023

(54) SCARIFICATION PROCESS AND POLYMER COATING FOR SEEDS

(71) Applicant: Velocigro Inc., Monrovia, CA (US)

(72) Inventor: Geoffrey C. Landis, Whittier, CA (US)

(73) Assignee: VELOCIGRO INC., Monrovia, CA (US)

(*) Notice: Subject to any disclaimer, the term of this patent is extended or adjusted under 35 U.S.C. 154(b) by 0 days.

(21) Appl. No.: 16/983,716

(22) Filed: Aug. 3, 2020

(65) Prior Publication Data

US 2021/0185889 A1  Jun. 24, 2021

Related U.S. Application Data

(60) Provisional application No. 62/882,074, filed on Aug. 2, 2019.

(51) Int. Cl.
*A01C 1/06* (2006.01)
*C09D 5/00* (2006.01)
*C09D 201/00* (2006.01)

(52) U.S. Cl.
CPC .............. *A01C 1/06* (2013.01); *C09D 5/008* (2013.01); *C09D 201/00* (2013.01)

(58) Field of Classification Search
CPC .... A01C 1/06; A01C 1/00; A01C 1/02; C09G 5/37; C09D 5/008; C09D 200/00; A01G 9/00; A01G 9/02; Y10S 47/09; A01H 3/00; A01H 3/02; A01H 4/00
See application file for complete search history.

(56) References Cited

U.S. PATENT DOCUMENTS

| 3,698,133 | A |  | 10/1972 | Schreiber |
| 4,834,788 | A |  | 5/1989 | Young |
| 4,931,079 | A |  | 6/1990 | Young |
| 6,453,608 | B1 | * | 9/2002 | Flanagan ........ A01C 1/06 47/57.6 |
| 2011/0000411 | A1 |  | 1/2011 | Ruban et al. |
| 2017/0127670 | A1 |  | 5/2017 | Bueno et al. |

FOREIGN PATENT DOCUMENTS

| GB | 670461 | A |  | 4/1952 |  |
| JP | 09-322611 | A |  | 12/1997 |  |
| JP | 11-146707 | A |  | 6/1999 |  |
| JP | 11146707 | A | * | 6/1999 | ...... A01C 1/06 |
| JP | 2005-270092 | A |  | 10/2005 |  |
| JP | 2005270092 | A | * | 10/2005 | ...... A01C 1/02 |
| JP | 2006-223274 | A |  | 8/2006 |  |

OTHER PUBLICATIONS

Lizarraga-Paulin et al.; Maize seed coatings and seedling sprayings with chitosan and hydrogen peroxide: their influence on some phenological and biochemical behaviors; Journal of Zhejiang University—Science B (Biomedicine & Biotechnology); 14(2); 2013; pp. 87-96.*

(Continued)

*Primary Examiner* — Kent L Bell
(74) *Attorney, Agent, or Firm* — Barnes & Thornburg, LLP

(57) ABSTRACT

Scarified seeds may be coated with a polymer or polymeric coating. The polymer or polymeric coated seeds may be stored for periods of time prior to use.

1 Claim, 2 Drawing Sheets

(56) References Cited

OTHER PUBLICATIONS

Young-Mathews et al., Longevity of Scarified Seed of Three Native Legumes under Different Seed Storage Conditions, Final Study Report at the USDA Natural Resources Conservation Service Corvallis Plant Materials Center, Corvallis, Oregon, Dec. 2017, 4 pages.
Garcia et al., Seed storage and germination, *Medicago truncatula* handbook, Nov. 2006, 9 pages.
McCormack, Jeffrey Holt, Seed Processing and Storage, Principles and practices of seed harvesting, processing, and storage: an organic seed production manual for seed growers in the Mid-Atlantic and Southern U.S., Version 1.6, Jul. 21, 2010, 29 pages.
Rosner et al., Effect of Gibberellic Acid and Standard Seed Treatments on Mountain Snowberry Germination, Native Plants Journal, vol. 3, No. 2, Fall 2002, 8 pages.
International Search Report on related PCT Application No. PCT/US2020/044779 from International Searching Authority (KIPO) dated Nov. 25, 2020.
Written Opinion on related PCT Application No. PCT Application No. PCT/US2020/044779 from International Searching Authority (KIPO) dated Nov. 25, 2020.
Extended European Search Report on EP20849222.3 from EPO dated Aug. 25, 2022.

* cited by examiner

SCARIFICATION PROCESS AND POLYMER COATING FOR SEEDS

CROSS REFERENCE TO RELATED APPLICATION

This application claims the benefit of the filing date of U.S. Provisional Patent Application No. 62/882,074, filed on Aug. 2, 2019, the disclosure of which is incorporated by reference herein.

BACKGROUND OF THE INVENTION

The present invention relates generally to agricultural seeds, and more particularly to the scarification and storage of seeds for agriculture.

The growth of plants from seeds to harvest may be a relatively lengthy process. Seeds are generally planted in soil or other growth medium, in which the seeds germinate. After germination, the germinated seeds may grow into plants for harvesting, either in the medium in which the seeds were germinated or after being replanted in some other medium. There is generally a delay between time of planting and time of germination, with of course additional delay between time of germination and a time at which the grown plants are ready for harvest. For example, some varieties of seeds (for example spinach) may take 10-12 days to germinate in the soil, with subsequent growth of the plants taking several weeks, potentially 3-6 weeks longer.

Decreasing the time between planting and time of harvesting may allow for an increasing number of crops over a given time period. For crops grown outdoors, seasonal conditions may allow for only a limited growing period, and reducing a planting to harvesting cycle time may allow for additional crops. For crops grown in climatically controlled conditions, for example in an indoors facility, reducing the planting to harvesting cycle time may allow for an increasing number of crops over a course of a period of time, possibly increasing effective output of the facility.

BRIEF SUMMARY OF THE INVENTION

The use of polymer-coated scarified seeds may be a way to decrease the time between planting a crop and harvesting crop. In addition, the added layer(s) of polymer(s) affords protection to the seed and is expected to produce a higher percentage of viable seeds after storage.

In some embodiments seeds are scarified and then provided a polymeric coating to prevent germination of the scarified seeds, or at least reduce numbers of germinated scarified seeds, until planting of the seeds. In some embodiments the polymeric coating prevents passage into the seeds of a sufficient amount of water to allow for germination of the seed. In some embodiments the polymeric coating prevents passage into the seeds of a sufficient amount of water, from atmospheric sources, to allow for germination of the seed. In some embodiments the water from atmospheric sources is atmospheric humidity normally present in air surrounding the seeds. In some embodiments the polymeric coating is water soluble, such that water applied to a field or aerosolized water in an aeroponic farming system will dissolve the polymeric coating so as to allow the seed to germinate. In some embodiments the polymeric coating is water insoluble, such that water applied to a field or aerosolized water in an aeroponic farming system will not dissolve the polymeric coating so as to allow the seed to germinate. In such embodiments another additive, for example an enzyme, may be applied to the seed to begin to break down the polymer and allow the seed to imbibe water.

These and other aspects of the invention are more fully comprehended upon review of this disclosure.

DETAILED DESCRIPTION

Figure 1:
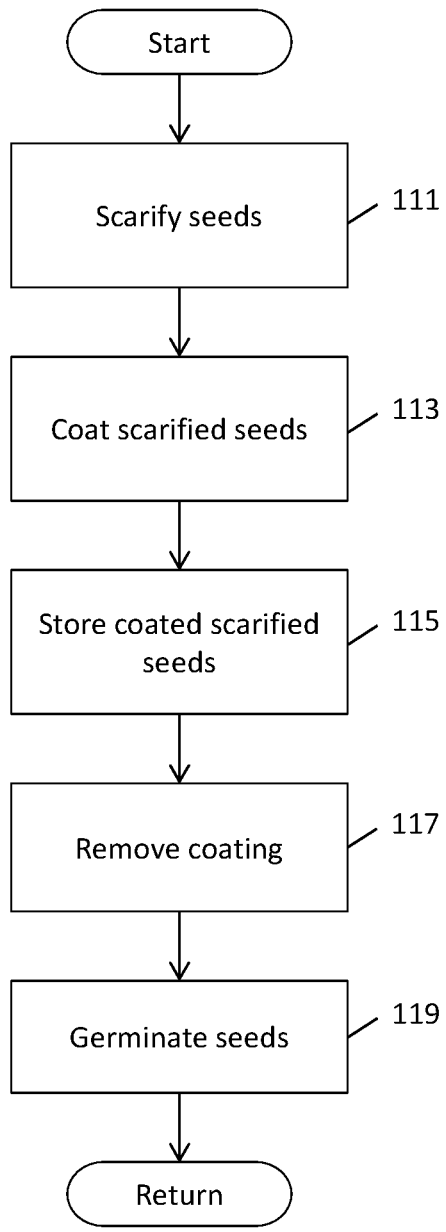
FIG. 1 is a flow chart of a seed modification process that reduces the time of germination for the modified seeds.

Germination time for seeds may be reduced by scarifying the seeds. Generally scarification of seeds is a process that pits the seedcoat of the seed. In some embodiments scarification of seeds may result in removal of the seedcoat of the seed, in whole or in part. In various embodiments, however, the scarification process may only partially remove the seedcoat, either by reducing an extent of coverage of the seedcoat over the seed or by reducing a thickness of the seedcoat, or a combination of both.

Scarified seeds are subject to becoming germinated with exposure to humidity. For example, if the scarified seeds are stored for any length of time, general humidity in the air may result in some of the seeds becoming hydrated and germinating during storage, prior to planting. In a closed container, water vapor outgassed from other seeds may also serve to increase humidity within the closed container sufficiently to result in germination of some of the seeds. In addition, various vectors (viruses, bacteria, etc.) may damage the scarified seed while in storage. Accordingly, it is often desirable to plant scarified seeds soon after the scarification process, for example to reduce seed wastage. In addition, it is possible that germination rates of scarified seeds, exposed to atmospheric or semi-atmospheric influences, may be reduced.

In various embodiments the scarified seeds are coated with a polymer or a polymeric substance, prior to storage. The coating is in a thin layer surrounding the seed in some embodiments. Coating the scarified seeds may allow for an increased number of available seeds for planting, and/or an increased number of germinated seeds, when time is increased between scarification and planting. In some embodiments the coating is a water-soluble coating. In some embodiments the coating comprises or consists essentially of a natural water-soluble polymer. In some embodiments the coating comprises or consists essentially of a synthetic water-soluble polymer. In some embodiments the natural water-soluble polymer and/or the synthetic water-soluble polymer is a polymer that forms a thin-layer dehydrated hydrogel(s) around the scarified seed. In some embodiments the coating comprises multiple layers of polymers and/or polymeric materials. In some embodiments the polymers may be hydrophobic. These hydrophobic polymers can be blended with hydrophilic polymers to make a water resistant seal around the scarified seed to protect it from moisture.

In some embodiments the natural water-soluble polymers are one or more of hydrogels of chitosan derivatives, xanthan gums, agar, dextran, cellulose ethers, and pectin, gellum, and others. In some embodiments the synthetic water-soluble polymers can be hydrogels of polyvinyl alcohol, cellulose ethers, povidones, polyethylene glycol, polyacrylamides, polyacrylic acid copolymers, and more. In some embodiments the coating is a single layer of polymer or polymeric material. In some embodiments the synthetic water-soluble polymers are substances that dissolve, disperse or swell in water and, thus modify the physical properties of the aqueous systems in the form of gelation, thickening or emulsification/stabilization. These polymers usually have repeating units or blocks of units; the polymer chains contain hydrophilic groups that are substituents or are incorporated into the backbone. The hydrophilic groups may be nonionic, anionic, cationic or amphoteric. Natural water-soluble polymers are substances will have many of the same properties as the synthetic water-soluble polymers. In addition to those properties they can be biodegrable and non-toxic to humans.

The polymer coating on the seed may be effectively removed by exposing it to water or other liquids. In some embodiments the polymer coating is effectively removed by actual removal of some or all of the polymer, such that moisture may reach the seed. In some embodiments the polymer coating is effectively removed through swelling the polymer or expanding the polymer chains to allow water to pass through the coating such that moisture may reach the seed. Accordingly, effectively removing the polymer may be termed as removing the polymer or as modifying the polymer herein, with either referring to effectively removing, unless the context clearly indicates otherwise. In some embodiments the coating may be modified upon planting the seed. In some embodiments the coating may be modified shortly before planting of the seed. In some embodiment the coating is modified after planting the seed.

With the seed coating modified, the seed may be re-hydrated, and by imbibing the water the seed can begin the process of rapid germinating. For example, upon germination, emerging from the micropyle, the radicle is the first part of a seedling to emerge from the seed. The embryonic root of the plant then grows downward into the soil, or other growth medium, and the shoot emerges forming the plumule. The hypocotyl emerges supporting the cotyledon(s).

In some embodiments a synthetic polymer is used to form the seed coating. In some embodiments the synthetic polymer is polyethylene glycol (PEG). In some embodiments the seeds are coated with polyethylene glycol (PEG 8000) solutions with initial osmotic potentials ranging from 0 to −1.25 MPa at 5 to 15 degrees Celsius. In some such embodiments the coating is removed by placing the seeds in water.

The seeds can be coated with one layer of polymer or more depending on which number of coatings worked the best. There is also the possibility of coating with one type of polymer or using a different polymer for each coat.

In some embodiments seed germination analysis may be conducted using germination curves fitted to the logistic equation:

$Pt=1/[1+\exp(-a-bt)]$

Where Pt is the cumulative percentage germination, a is the y intercept, b is the slope, and t is the thermal time in degree hours from the initiation of the experiment. The cumulative percentage germination may be calculated at each measurement interval using:

$Pt=nt/N$

Where nt is the number of seeds germinated at time t and N is the final number of seeds germinated. These values can be used to understand the effect the polymers had on the germination rates of the scarified seeds after storage, and re-hydration of the seeds.

Referring now to the Figures, FIG. 1 is a flow chart of a process for reducing time of germination for seeds that may be stored prior planting.

Figure 2A:
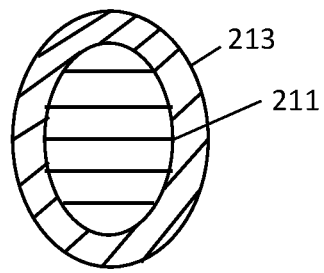
FIG. 2A is a cross-section of a representation of a seed.

In block 111, seeds are scarified. FIG. 2A shows a representation of a cross-section of a seed, prior to scarification. The representation of FIG. 2A (and FIGS. 2B and 2C) omits various internal details of the seed. The representation of FIG. 2A does show, however, an internal portion 211 of the seed, with the internal portion surrounded by a seed coat 213.

In some embodiments the seeds are scarified mechanically. In some embodiments the seeds are scarified thermally. In some embodiments the seeds are scarified chemically. In some embodiments the seeds are scarified by being placed in an acid solution for a period of time. In some embodiments the acid is sulfuric acid. In some embodiments the sulfuric acid is 6 N, 18 N, 36 N, and the seeds are placed in the sulfuric acid for 30 to 120 minutes. In some embodiments the seeds are soaked in a sodium bicarbonate solution after being removed from the sulfuric acid, to remove excess acid from the seeds.

Figure 2B:
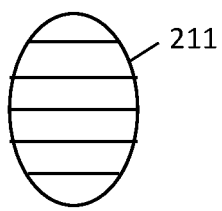
FIG. 2B is a cross-section of a representation of a scarified seed.

FIG. 2B shows a cross-section of a representation of a scarified seed. The scarified seed of FIG. 2B is the seed of FIG. 2A, with the seed coat removed and the internal portion 211 of the seed exposed. In various embodiments some portions of the seed coat may remain, however. For example, in some embodiments a portion of the seed coat may still surround the internal portion of the seed, but with the seed coat being of reduced thickness. Also for example, in some embodiments portion of the seed coat may still adhere to some parts of the internal portion of the seed, with some parts of the internal portion of the seed not covered by remaining seed coat.

Figure 2C:
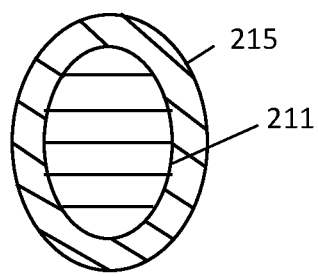
FIG. 2C is a cross-section of a representation of a scarified seed with a polymeric coating.

In block 113 the seeds are coated with a polymer or polymeric coating. The polymer or polymeric coating may be as discussed herein. FIG. 2C is a cross-section of a representation of a scarified seed with a polymeric coating 215. The polymeric coating may be, for example, a polymer as discussed herein. In various embodiments the polymeric coating may include a plurality of layers of different polymers.

In block 115 the scarified coated seeds are stored for later use. In some embodiments the seeds are stored for several days. In some embodiments the seed are stored for several weeks. In some embodiments the seeds are stored for several months. In some embodiments the seeds are stored in an enclosed canister, or some other storage container.

In block 117 the coatings are modified from the scarified coated seeds, or at least some of them. In some embodiments the coatings are modified upon or after the seeds are planted. For example, in some embodiments the scarified coated seeds are planted in soil, and water or liquid nutrient solution is applied to the soil, with the water or liquid nutrient solution dissolving a portion of the polymeric coating. Also for example, in some embodiments the scarified coated seeds are placed in a hydroponic or aeroponic plant growth facility, and the water or aerosolized water of the plant growth facility modifies the polymeric coating. In some embodiments the scarified coated seeds are placed in a solution prior to planting, to allow the polymeric coating to be modified, in whole or in some embodiments in part, prior to planting.

In block 119 the seeds with polymeric coatings removed, or some of them, germinate. Generally, the seeds imbibe water, and thereafter germinate.

Although the invention has been discussed with respect to various embodiments, it should be recognized that the invention comprises the novel and non-obvious claims supported by this disclosure.

What is claimed is:

1. A method of treating seeds for storage, comprising:
   scarifying seeds;
   coating the scarified seeds with a polymeric coating; and
   storing the polymeric-coated scarified seeds for later use;
   wherein the polymeric coating is a hydrogel of a chitosan derivative that swells upon exposure to water to allow passage of moisture to the scarified seeds.

* * * * *